US012674071B2

(12) United States Patent
Faber et al.

(10) Patent No.: US 12,674,071 B2
(45) Date of Patent: Jul. 7, 2026

(54) COATED OPTICAL ARTICLES

(71) Applicant: PPG Industries Ohio, Inc., Cleveland, OH (US)

(72) Inventors: Matthew S. Faber, Gibsonia, PA (US); Amelia Elizabeth Horner, Johnstown, PA (US); Matthew S. Luchansky, Wexford, PA (US); Wei Wang, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1004 days.

(21) Appl. No.: 17/428,112

(22) PCT Filed: Feb. 4, 2020

(86) PCT No.: PCT/US2020/016557
§ 371 (c)(1),
(2) Date: Aug. 3, 2021

(87) PCT Pub. No.: WO2020/163312
PCT Pub. Date: Aug. 13, 2020

(65) Prior Publication Data
US 2022/0186065 A1    Jun. 16, 2022

Related U.S. Application Data

(60) Provisional application No. 62/801,407, filed on Feb. 5, 2019.

(51) Int. Cl.
| | |
|---|---|
| *C09D 161/00* | (2006.01) |
| *C08J 7/04* | (2020.01) |
| *C09D 5/00* | (2006.01) |
| *C09D 5/02* | (2006.01) |
| *C09D 7/61* | (2018.01) |
| *C09D 7/63* | (2018.01) |
| *C09D 175/04* | (2006.01) |
| *G02B 1/115* | (2015.01) |
| *G02B 1/14* | (2015.01) |

(52) U.S. Cl.
CPC ............ *C09D 161/00* (2013.01); *C08J 7/042* (2013.01); *C09D 5/002* (2013.01); *C09D 5/02* (2013.01); *C09D 7/61* (2018.01); *C09D 7/63* (2018.01); *C09D 175/04* (2013.01); *G02B 1/115* (2013.01); *G02B 1/14* (2015.01); *C08J 2369/00* (2013.01); *C08J 2461/00* (2013.01); *C08J 2475/04* (2013.01)

(58) Field of Classification Search
None
See application file for complete search history.

(56) References Cited

U.S. PATENT DOCUMENTS

| | | | |
|---|---|---|---|
| 2006/0147674 A1* | 7/2006 | Walker, Jr. ............. | C08J 7/0427 524/413 |
| 2019/0085203 A1* | 3/2019 | Faler ................... | C08F 290/067 |
| 2020/0239730 A1 | 7/2020 | Martin et al. | |

FOREIGN PATENT DOCUMENTS

| | | | | |
|---|---|---|---|---|
| CN | 105907299 B | * | 4/2018 | ............. C08G 77/06 |
| EP | 0989163 A1 | | 3/2000 | |
| EP | 2975439 A1 | * | 1/2016 | ............. C08J 7/047 |
| WO | WO-2017180220 A1 | * | 10/2017 | ............. B05D 1/02 |
| WO | 2018022788 A1 | | 2/2018 | |

OTHER PUBLICATIONS

Zhu et al., CN-105907299-B, Apr. 13, 2018 (machine translation) (Year: 2018).*

* cited by examiner

*Primary Examiner* — Cheng Yuan Huang

(57) ABSTRACT

A coated optical article includes: an optical substrate; a first coating layer applied directly over at least a portion of an optical substrate, the first coating layer formed from a first coating composition including an aqueous medium and keto and/or aldo functional polymeric materials that are dispersed in the aqueous medium; and a second coating layer applied directly over at least a portion of the first coating layer, the second coating layer including a sol-gel and which is formed from a second coating composition. The first coating composition and second coating composition are each independently substantially free of hydrazine and hydrazide functional components.

20 Claims, No Drawings

COATED OPTICAL ARTICLES

CROSS REFERENCE TO RELATED APPLICATION

This application claims priority to United States Non-Provisional Patent Application No. 62/801,407, filed Feb. 5, 2019, the disclosure of which is incorporated herein by reference in its entirety.

FIELD OF THE INVENTION

The present invention relates generally to optical articles that comprise substrates coated with multi-layer coatings.

BACKGROUND OF THE INVENTION

Optical articles, such as optical lenses and vehicular windows for example, comprise substrates that are typically coated with one or more coating layers to provide various properties such as abrasion resistance. For instance, optical substrates are commonly coated with a primer coating layer and an abrasion resistant coating layer. The primer coating is interposed between the optical substrate and the abrasion resistant coating layer, and serves as a barrier coating to prevent interaction of the polymeric components of the abrasion resistant coating layer with the substrate and vice versa, a cushion coating for enhanced impact resistance, and/or as an adhesive layer to promote adhesion of the abrasion resistant coating layer to the substrate surface.

Current coating layers, such as primer coating layers, applied to optical substrates often contain various solvents. However, regulatory authorities have identified many of these solvents as a concern. For instance, many commercially available primers for optical substrates contain N-methyl-2-pyrrolidone (NMP) and which has been identified as a potential concern by regulatory authorities.

Accordingly, it would be advantageous to provide a coated optical article which exhibits various desirable properties and which utilizes coatings that do not contain NMP and similar solvents of concern.

SUMMARY OF THE INVENTION

The present invention relates to a coated optical article comprising: an optical substrate; a first coating layer applied directly over at least a portion of an optical substrate, the first coating layer formed from a first coating composition comprising an aqueous medium and keto and/or aldo functional polymeric materials dispersed in the aqueous medium; and a second coating layer applied directly over at least a portion of the first coating layer, the second coating layer comprising a sol-gel and which is formed from a second coating composition comprising a sol. The first coating composition and second coating composition are each independently substantially free of hydrazine and hydrazide functional components.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" core-shell particle, "a" polymer, and the like refer to one or more of any of these items.

As indicated, the present invention relates to an optical article comprising an optical substrate coated with a multi-layer coating. As used herein, the term "optical" means pertaining to or associated with light and/or vision. The term "optical substrate" means that the specified substrate exhibits a light transmission value (transmits incident light) of at least 4 percent, such as at least 50 percent, or at least 70 percent, or at least 85 percent, and exhibits a haze value of less than 5 percent, for example 1 percent, such as less than 0.5 percent, when measured at 550 nanometers by, for example, a Hunter UltraScan PRO (Hunter Associates Laboratory, Inc.) using D65 illuminant.

Optical substrates suitable for use in the preparation of the coated articles of the present invention can include any of the optical substrates known in the art, including non-plastic substrates such as glass. Suitable examples of plastic substrates include polyol(ally carbonates), e.g., allyl diglycol carbonates such as diethylene glycol bis(allyl carbonate), which is sold under the trademark CR-39 by PPG Industries, Inc.; polyurea-polyurethane (polyurea urethane) polymers, which are prepared, for example, by the reaction of a polyurethane prepolymer and a diamine curing agent, a composition for one such polymer being sold under the trademark TRIVEX® by PPG Industries, Inc.; polymers of: polyol(meth)acryloyl terminated carbonates, diethylene glycol dimethacrylates, ethoxylated phenol methacrylates, diisopropenyl benzenes, ethoxylated trimethylol propane triacrylates, ethylene glycol bismethacrylates, poly(ethylene glycol) bismethacrylates, urethane acrylates, or mixtures of any of the foregoing; poly(ethoxylated Bisphenol A dimethacrylate); poly(vinyl acetate); poly(vinyl alcohol); poly (vinyl chloride); poly(vinylidene chloride); polyethylene; polypropylene; polyurethanes; polythiourethanes; thermoplastic polycarbonates, such as the carbonate-linked resin derived from Bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfides, either homopolymerized or co- and/or terpolymerized with polythiols, polyisocyanates, polyisothiocyanates and optionally ethylenically unsaturated or halogenated aromatic-containing vinyls. Also suitable are copolymers and blends of the described polymers and copolymers with other polymers, e.g., to form interpenetrating network products. The substrate itself may be transparent, or the substrate may possess a light influencing property such as a tint, photochromism, polarization and/or dichroism. Also, the substrate may possess at least one light influencing property. The substrate may comprise a coating, such as an adhesion layer, a functional layer, a tie layer, and/or a transparent conductive layer.

The term "polymer" refers to oligomers and homopolymers (e.g., prepared from a single monomer species), copolymers (e.g., prepared from at least two different monomer species), terpolymers (e.g., prepared from at least three different monomer species) and graft polymers. The term "resin" is used interchangeably with "polymer."

Further, the term "tinted", as used for example in connection with ophthalmic elements and optical substrates, means that the indicated item contains a fixed light radiation absorbing agent, such as but not limited to, conventional coloring dyes, infrared and/or ultraviolet light absorbing materials on or in the indicated item. The term "non-tinted", as used for example in connection with ophthalmic elements and optical substrates, means that that the indicated item is substantially free of fixed light radiation absorbing agents.

The term "transparent", as used for example in connection with a substrate, film, material and/or coating, means that the indicated substrate, coating, film and/or material has the property of transmitting light without appreciable scattering so that objects lying beyond are entirely visible.

Substrates used most often include poly(meth)acrylate, TAC (triacetate cellulose), DAC (diacetate cellulose), polyallyldiglycol carbonate (ADC), nylon, polyamide, polyurethane(urea) polymers, polyethylene terephthalate, polycarbonate, sulfur-containing polyurethane, and/or sulfur-containing polyurethane(urea).

Optical articles of the present invention include mirrors, active and passive liquid crystal cell elements, magnifying lenses, ophthalmic articles such as plano (without optical power) and vision correcting (prescription) lenses (finished and semi-finished) including multifocal lenses (bifocal, trifocal, and progressive lenses); and ocular devices such as contact lenses and intraocular lenses, sun lenses, fashion lenses, sport masks, face shields, visors and goggles. The optical article may also be chosen from glazings such as windows and vehicular transparencies such as automobile windshields and side windows, display elements and devices. As used herein the term "display" means the visible representation of information in words, numbers, symbols, designs or drawings. Examples of display elements and devices include screens, monitors, and security elements. Examples of security elements include security marks and authentication marks that are connected to a substrate, such as and without limitation: access cards and passes, e.g., tickets, badges, identification or membership cards, debit cards etc.; negotiable instruments and non-negotiable instruments, e.g., drafts, checks, bonds, notes, certificates of deposit, stock certificates, etc.; government documents, e.g., currency, licenses, identification cards, benefit cards, visas, passports, official certificates, deeds etc.; consumer goods, e.g., software, compact discs ("CDs"), digital-video discs ("DVDs"), appliances, consumer electronics, sporting goods, cars, etc.; credit cards; and merchandise tags, labels and packaging.

When certain optical articles are to be prepared, it may be desirable for the refractive index of the substrate to be at least 1.50. For example the refractive index of the substrate can range from 1.50 to 1.80, such as from 1.50 to 1.74. In such instances, the substrate can comprise allyl diglycol carbonate, polycarbonate, sulfur-containing polyurethanes and/or sulfur-containing polyurethane(ureas). Suitable examples of substrates comprising sulfur-containing polyurethanes and sulfur-containing polyurethane(ureas) can include those described in U.S. Patent Publication No. 2006/0241273A1, filed Feb. 22, 2006, at paragraphs [0010] to [0269], incorporated by reference herein. Also, suitable examples of substrates comprising sulfur-containing polyurethanes and sulfur-containing polyurethane(ureas) can include those prepared from a composition comprised of the thioether-functional oligomeric polythiols described in U.S. Patent Publication No. 2007/0270548A1, filed May 4, 2007 at paragraphs [0053] to [0247], incorporated by reference herein. Further suitable examples of sulfur-containing polyurethanes can include those described in U.S. Patent Publication No. 2007/0142604A1, filed Dec. 16, 2005, at paragraph nos. [0007] to [0020]; [0023] to [0032]; [0034] to [0036]; and [0038] to [0272], all of the cited portions being incorporated by reference herein. Likewise, suitable examples of sulfur-containing polyurethane(ureas) can include those described in U.S. Patent Publication No. 2007/0142606A1, filed Dec. 16, 2005, at paragraph nos. [0006] to [0022]; [0025] to [0034]; [0036] to [0038]; and [0040] to [0296], all of the cited portions being incorporated by reference herein.

As indicated, the optical substrates are coated with a multi-layer coating. The multi-layer coating includes at least a first coating layer formed directly over at least a portion of the optical substrate and a second coating layer formed directly over at least a portion of the first coating layer. The multi-layer coating can also include additional coating layers such as one or more coating layers applied over the second coating layer, directly or indirectly.

As used herein, a coating layer applied "directly" over a substrate (e.g., an optical substrate) means that the coating layer is applied over the substrate without another coating layer positioned in between. Further, a second coating layer applied "directly" over a first coating layer means that the second coating layer is applied over the first coating layer without another coating layer positioned in between. It is appreciated that the optional additional coating layers can also be applied directly over a previously applied coating layer.

The first coating layer is formed from a first coating composition comprising an aqueous medium and polymeric materials comprising keto functional groups (also referred to as ketone functional groups) and/or aldo functional groups (also referred to as aldehyde functional groups). dispersed in the aqueous medium. An "aqueous medium" refers to a liquid medium comprising greater than 50 weight % water, based on the total weight of the liquid medium. Such aqueous liquid mediums can comprise at least 60 weight % water, or at least 70 weight % water, or at least 80 weight % water, or at least 90 weight % water, or at least 95% water, based on the total weight of the liquid medium. The solvents that make up less than 50 weight % of the liquid medium include organic solvents. Non-limiting examples of suitable organic solvents include polar organic solvents e.g. protic organic solvents such as glycols, glycol ether alcohols, alcohols, and volatile ketones, glycol diethers, esters, and diesters. Other non-limiting examples of organic solvents include aromatic and aliphatic hydrocarbons.

Further, the first coating composition can be substantially free, essentially free, or completely free of N-methyl-2-pyrrolidone (NMP). As used herein, the terms "substantially free" means that the coating composition contains less than 1000 parts per million (ppm) of a certain component such as NMP, "essentially free" means that the coating composition contains less than 100 ppm of a certain component such as such as NMP, and "completely free" means that the coating composition contains less than 20 parts per billion (ppb) of a certain component such as such as NMP.

As indicated, the first coating composition also comprises keto and/or aldo functional polymeric materials dispersed in the aqueous medium. In some examples, the keto and/or aldo functional polymeric materials comprise core-shell particles. The aqueous dispersed core-shell particles comprise a core that is at least partially encapsulated by the shell. A core-shell particle in which the core is at least partially encapsulated by the shell refers to a particle comprising (i) at least a first material or materials that form the center of the particle (i.e., the core) and (ii) at least a second material or materials (i.e., the shell) that form a layer over at least a portion of the surface of the first material(s) (i.e., the core). It is appreciated that the first material(s) that forms the core is different from the second material(s) that forms the shell. Further, the core-shell particles can have various shapes (or morphologies) and sizes. For example, the core-shell particles can have generally spherical, cubic, platy, polyhedral, or acicular (elongated or fibrous) morphologies. The core-shell particles can also have an average particle size of 30 to 300 nanometers, or from 40 to 200 nanometers, or from 50 to 150 nanometers. As used herein, "average particle size" refers to volume average particle size. The average particle size can for example be determined with a Zetasizer 3000HS following the instructions in the Zetasizer 3000HS manual.

The polymeric core typically comprises an addition polymer derived from ethylenically unsaturated monomers. As used herein, "ethylenically unsaturated" refers to a group having at least one carbon-carbon double bond. Non-limiting examples of ethylenically unsaturated monomers include, but are not limited to, (meth)acrylate monomers, vinyl monomers, and combinations thereof. As such, the polymeric core can comprise a (meth)acrylate polymer, a vinyl polymer, or a combination thereof. As used herein, the term "(meth)acrylate" refers to both the methacrylate and the acrylate. Moreover, the backbone, or main chain, of a polymer or polymers that form at least a portion of the polymeric shell can comprise urea linkages and/or urethane linkages and may optionally further comprise other linkages. For instance, the polymeric shell can comprise a polyurethane with a backbone that includes urethane linkages and urea linkages. As indicated, the polymeric shell can also comprise additional linkages including, but not limited to, ester linkages, ether linkages, and combinations thereof.

The keto and/or aldo functional groups of the core-shell particles can be on the core and/or the shell of the core-shell particles. For instance, the polymeric shell can comprise pendant and/or terminal keto and/or aldo functional groups. A "pendant group" refers to a group that is an offshoot from the side of the polymer backbone and which is not part of the polymer backbone. In contrast, a "terminal group" refers to a group on an end of the polymer backbone and which is part of the polymer backbone.

It is appreciated that the first coating composition can comprise a combination of core-shell particles with the keto and/or aldo functional groups on only the shell and core-shell particles with the keto and/or aldo functional groups on only the core. The first coating composition can also comprise only core-shell particles having keto and/or aldo functional groups on the shell and which is free of core-shell particles having keto and aldo functional groups on the core. Alternatively, the first coating composition can comprise only core-shell particles having keto and/or aldo functional groups on the core and which is free of core-shell particles having keto and aldo functional groups on the shell.

Non-limiting examples of additional functional groups that can be present on the polymeric shell and/or the polymeric core include carboxylic acid groups, amine groups, epoxide groups, hydroxyl groups, thiol groups, carbamate groups, amide groups, isocyanate groups (including blocked isocyanate groups), ethylenically unsaturated groups, and combinations thereof. It is appreciated that the polymeric shell, polymeric core, or both, can be free of (i.e., does not contain) any of the additional reactive functional groups.

The polymeric core and polymeric shell of the core-shell particles can be prepared to provide a hydrophilic polymeric shell with enhanced water-dispersibility/stability and a hydrophobic polymeric core. As used herein, the term "hydrophilic" refers to polymers, monomers, and other materials that have an affinity for water and which will disperse or dissolve in water or other aqueous based mediums. Hydrophilic materials, such as hydrophilic polymers, typically have water-dispersible groups. A "water-dispersible group" refers to a group having or formed from one or more hydrophilic functional groups that have an affinity for water and which help disperse a compound, such as a polymer, in water or other aqueous based mediums. Further, as used herein, the term "hydrophobic" refers to polymers, monomers, and other materials that lack an affinity for water or other aqueous based mediums and tend to repel, not dissolve or disperse in, and/or not be wetted by water or other aqueous based mediums. Hydrophobic materials, such as hydrophobic polymers, are often free of water-dispersible groups.

As indicated, the polymeric core and polymeric shell of the core-shell particles can be prepared to provide a hydrophilic polymeric shell with enhanced water-dispersibility/stability and a hydrophobic polymeric core. Thus, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in the aqueous medium so that the polymeric shell at least partially encapsulates the hydrophobic core.

As previously described, the water-dispersible groups comprise one or more hydrophilic functional groups. For example, the polymer(s) that form the hydrophilic polymeric shell can comprise ionic or ionizable groups such as acid groups like carboxylic acid functional groups or salts thereof. Carboxylic acid functional group could for example be introduced by using a carboxylic acid group containing diol to form the polymeric shell. The acid groups such as carboxylic acid functional groups can be at least partially neutralized (i.e., at least 30% of the total neutralization equivalent) by an inorganic base, such as a volatile amine, to form a salt group. A volatile amine refers as an amine compound having an initial boiling point of less than or equal to 250° C. as measured at a standard atmospheric pressure of 101.3 kPa. Examples of suitable volatile amines are ammonia, dimethylamine, trimethylamine, monoethanolamine, and dimethylethanolamine. It is appreciated that the amines will evaporate during the formation of the coating to expose the acid groups such as carboxylic acid functional groups and allow the acid groups such as carboxylic acid functional groups to undergo further reactions such as with a crosslinking agent reactive with the acid groups or carboxylic acid functional groups. Other non-limiting examples of water-dispersible groups include polyoxyalkylene groups such as by using polyethylene/propylene glycol ether materials for example.

The polymeric shell is also covalently bonded to at least a portion of the polymeric core. For example, the polymeric shell can be covalently bonded to the polymeric core by reacting at least one functional group on the monomers and/or prepolymers that are used to form the polymeric shell with at least one functional group on the monomers and/or prepolymers that are used to form the polymeric core. The functional groups can include any of the functional groups previously described provided that at least one functional group on the monomers and/or prepolymers that are used to form the polymeric shell is reactive with at least one functional group on the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond. As used herein, a "prepolymer" refers to a polymer precursor capable of further reactions or polymerization by one or more reactive groups to form a higher molecular mass or cross-linked state.

Various components can be used to form the core-shell particles. For example, the core-shell particles can be formed from isocyanate functional polyurethane prepolymers, ethylenically unsaturated monomers, and optionally polyamines. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may, for example, react with an isocyanate group to form a urethane linkage. A primary or secondary amine group may react with an isocyanate group to form a urea linkage. Examples of suitable compounds that can be used to form the polyurethane include, but are not limited to, polyols, polyisocyanates, compounds containing carboxylic acids such as diols containing carboxylic acids, polyamines, hydroxyl functional ethylenically unsaturated components such as hydroxyalkyl esters of (meth)acrylic acid, and/or other compounds having reactive functional groups, such as hydroxyl groups, thiol groups, amine groups, and carboxylic acids. The polyurethane prepolymer can also be prepared with keto and/or aldo functional monoalcohols.

Non-limiting examples of suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

Examples of polyols that can be used to prepare the polyurethane based polymer include, but are not limited to, lower molecular weight glycols, polyether polyols, polyester polyols, copolymers thereof, and combinations thereof. Non-limiting examples of low molecular weight glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols include polytetrahydrofuran, polyethylene glycol, polypropylene glycol, polybutylene glycol, and combinations thereof. Non-limiting examples of polyester polyols include those prepared from a polyol comprising an ether moiety and a carboxylic acid or anhydride.

Other suitable polyols include, but are not limited to, cyclohexanedimethanol, 2-ethyl-1,6-hexanediol, 1,3-propanediol, 1,4-butanediol, neopentyl glycol, trimethylol propane, 1,2,6-hexantriol, glycerol, and combinations thereof. Further, suitable amino alcohols that can be used include, but are not limited to, ethanolamine, propanolamine, butanolamine, and combinations thereof.

Suitable carboxylic acids, which can be reacted with the polyols to form a polyester polyol, include, but are not limited to, diacids such as glutaric acid, succinic acid, malonic acid, oxalic acid, phthalic acid, isophthalic acid, hexahydrophthalic acid, adipic acid, maleic acid, and mixtures thereof. Further, non-limiting examples of acid containing diols include, but are not limited to, 2,2-bis(hydroxymethyl)propionic acid, which is also referred to as dimethylolpropionic acid (DMPA), 2,2-bis(hydroxymethyl) butyric acid, which is also referred to as dimethylol butanoic acid (DMBA), diphenolic acid, and combinations thereof.

Examples of keto functional monoalcohols that can be used in the preparation of the polyurethane prepolymer and to provide keto and/or aldo functionality include, but are not limited to, hydroxyacetone, 4-hydroxy-2-butanone, 5-hydroxy-4-octanone, 4-hydroxy-4-methylpentan-2-one, which is also referred to as diacetone alcohol, 3-hydroxyacetophenone, and combinations thereof. Further, non-limiting examples of aldo functional monoalcohols include D-lactaldehyde solution, 3-hydroxy-butanal, 4-hydroxy-pentanal, 5-hydroxy-hexanal, 5-hydroxy-5-methylhexanal, 4-hydroxy-4-methyl-pentanal, 3-hydroxy-3-methylbutanal, and combinations thereof.

Non-limiting examples of compounds, which can be used to incorporate ethylenically unsaturated moieties to the polyurethane prepolymer, include hydroxyalkyl esters of (meth)acrylic acid such as hydroxymethyl (meth)acrylate, hydroxyethyl (meth)acrylate, hydroxypropyl (meth)acrylate, hydroxybutyl (meth)acrylate, and combinations thereof.

The components that form the polyurethane prepolymer can be reacted in a stepwise manner, or they can be reacted simultaneously. For example, the polyurethane prepolymer can be formed by reacting a diisocyanate, a polyol, a carboxyl group-containing diol, a hydroxyl group-containing ethylenically unsaturated monomer, and, optionally, a keto functional monoalcohol simultaneously.

The polyurethane prepolymers can also be prepared in the presence of catalysts, polymerization inhibitors, and combinations thereof. Non-limiting examples of catalysts include triethylamine, N-ethyl morpholine, triethyldiamine, and the like, as well as tin catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

As previously mentioned, the core-shell particles can also be prepared with polyamines and ethylenically unsaturated monomers not incorporated into the polyurethane during preparation thereof. For instance, the isocyanate functional polyurethane prepolymers can be prepared as described above and then reacted with polyamines as a chain extender. As used herein, a "chain extender" refers to a lower molecular weight compound having two or more functional groups that are reactive towards isocyanate.

Suitable polyamines that can be used to prepare the polyurethane based polymer include aliphatic and aromatic compounds, which comprise two or more amine groups selected from primary and secondary amine groups. Examples include, but are not limited to, diamines such as, for example, ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, and combinations thereof. Suitable polyamines are also sold by Huntsman under the trade name JEFFAMINE®, such as JEFFAMINE® D-230 and JEF-FAMINE® D-400.

Other non-limiting examples of suitable polyamine functional compounds include the Michael addition reaction products of a polyamine functional compound, such as a diamine, with keto and/or aldo containing ethylenically unsaturated monomers. The polyamine functional compound typically comprises at least two primary amino groups (i.e., a functional group represented by the structural formula —NH$_2$), and the keto and/or aldo containing unsaturated monomers include, but are not limited to, (meth) acrolein, diacetone (meth)acrylamide, diacetone (meth) acrylate, acetoacetoxyethyl (meth)acrylate, vinyl acetoacetate, crotonaldehyde, 4-vinylbenzaldehyde, and combinations thereof. The resulting Michael addition reaction products can include a compound with at least two secondary amino groups (i.e., a functional group represented by the structural formula —NRH in which R is a hydrocarbon) and at least two keto and/or aldo functional groups. It is appreciated that the secondary amino groups will react with the isocyanate functional groups of the polyurethane prepolymers to form urea linkages and chains extend the polyurethanes. Further, the keto and/or aldo functional groups will extend out from the backbone of the chain-extended polyurethane, such as from the nitrogen atom of the urea linkage, for example, to form a polyurethane with pendant keto and/or aldo functional groups.

After reacting the polyurethane prepolymers and polyamines, the chain-extended polyurethane and additional ethylenically unsaturated monomers can be subjected to a polymerization process to form the core-shell particles. The additional ethylenically unsaturated monomers can be added after forming the polyurethane. Alternatively, the additional ethylenically unsaturated monomers can be used as a diluent during preparation of the polyurethane prepolymer and not added after formation of the polyurethane. It is appreciated that ethylenically unsaturated monomers can be used as a diluent during preparation of the polyurethane prepolymer and also added after formation of the polyurethane.

The additional ethylenically unsaturated monomers can comprise multi-ethylenically unsaturated monomers, mono-ethylenically unsaturated monomers, or combinations thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Non-limiting examples of ethylenically unsaturated monomers include, but are not limited to, alkyl esters of (meth)acrylic acid, hydroxyalkyl esters of (meth)acrylic acid, acid group containing unsaturated monomers, vinyl aromatic monomers, aldo or keto containing unsaturated monomers, and combinations thereof.

Non-limiting examples of alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, and combinations thereof. Other non-limiting examples include di(meth)acrylate alkyl diesters formed from the condensation of two equivalents of (meth)acrylic acid such as, for example, ethylene glycol di(meth)acrylate. Di(meth)acrylate alkyl diesters formed from C$_{2-24}$ diols such as butane diol and hexane diol can also be used.

Non-limiting examples of hydroxyalkyl esters of (meth) acrylic acid and keto and aldo containing ethylenically unsaturated monomers include any of those previously described. Non-limiting examples of acid group containing ethylenically unsaturated monomers include (meth)acrylic acid, itaconic acid, maleic acid, fumaric acid, crotonic acid, aspartic acid, malic acid, mercaptosuccinic acid, and combinations thereof.

Non-limiting examples of vinyl aromatic monomers include styrene, 2,4-dimethylstyrene, ethylstyrene, isopropylstyrene, butylstyrene, vinyl naphthalene, vinyl toluene, divinyl aromatic monomers such as divinyl benzene, and combinations thereof.

As previously noted, the ethylenically unsaturated monomers can be polymerized in the presence of the polyurethane, which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

Thus, the core-shell particles can be prepared with any of the previously described components. For example, the core-shell particles of the present invention can be prepared with: (i) ethylenically unsaturated monomers; (ii) polyurethane prepolymers comprising isocyanate functional groups, carboxylic acid functional groups, and ethylenically unsaturated groups; and (iii) the Michael addition reaction product of a diamine and keto and/or aldo containing unsaturated monomers. The resulting core-shell particles comprise a polymeric core prepared from ethylenically unsaturated monomers that is covalently bonded to at least a portion of a polyurethane shell having pendant carboxylic acid functional groups, pendant keto and/or aldo functional groups, urethane linkages, and urea linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described.

Another non-limiting example of core-shell particles that can be used in the first coating composition are prepared with at least: (i) ethylenically unsaturated monomers in which at least some of the ethylenically unsaturated monomers comprise keto or aldo functional groups; and (ii) polyurethanes comprising isocyanate functional groups, carboxylic acid functional groups, and ethylenically unsaturated groups. The resulting core-shell particles comprise a polymeric core having keto or aldo groups prepared from ethylenically unsaturated monomers and which is covalently bonded to at least a portion of a polyurethane shell having at least pendant carboxylic acid functional groups and urethane linkages. For enhanced water-dispersibility/stability, the carboxylic acid functional groups on the polymeric shell can be at least partially neutralized (i.e., at least 30 percent of the total neutralization equivalent) by an inorganic base, such as a volatile amine, to form a salt group as previously described.

It is appreciated that any combination of core-shell particles described herein can be dispersed in an aqueous medium to form a latex. As used herein, a "latex", with respect to the aqueous dispersed core-shell particles, refers to an aqueous colloidal dispersion of polymeric particles.

The keto and/or aldo functional polymeric materials, such as the previously described, core-shell particles can comprise at least 30 weight %, at least 35 weight %, or at least 50 weight %, based on the total solids weight of the first coating composition. The keto and/or aldo functional polymeric materials can also comprise up to 100 weight %, up to 98 weight %, or up to 90 weight %, based on the total solids weight of the first coating composition. The keto and/or aldo functional polymeric materials can further comprise an amount within a range such as, for example, from 30 weight % to 100 weight %, or from 35 weight % to 98 weight %, or from 50 weight % to 98 weight %, based on the total solids weight of the first coating composition.

The first coating composition may optionally also comprise additional components. For example, the first coating composition can also comprise a refractive index modifier. As used herein, a "refractive index modifier" refers to a component that is capable of increasing or decreasing the refractive index of the coating formed from the coating composition.

The refractive index modifier can comprise, but is not limited to, a metal oxide. Non-limiting examples of metal oxides that can be used as the refractive index modifier include oxides of titanium, zirconium, cerium, tantalum, tin, niobium, and combinations thereof. The metal oxides are often provided as dispersions of nanoparticles. The nanoparticles may be dispersed in aqueous or solvent medium. The metal oxide nanoparticles typically have an average particle size of up to 500 nanometers (i.e., 500 nm or less), such as 200 nm or less, such as 100 nm or less, such as 50 nm or less. A particle size smaller than that of the wavelength of visible light prevents light scatter and minimizes haze. Non-limiting examples of suitable dispersions of metal oxide nanoparticles include those available under the tradename NANOBYK (BYK USA).

The refractive index modifier, when present, can comprise at least 0.1 weight %, at least 1 weight %, at least 10 weight %, or at least 20 weight %, based on the total solids weight of the first coating composition. The refractive index modifier, when present, can also comprise up to 65 weight %, up to 45 weight %, up to 35 or up to 30 weight %, based on the total solids weight of the first coating composition. The refractive index modifier, when present, can further comprise an amount within a range such as, for example, from 0.1 weight % to 65 weight %, or from 1 weight % to 45 weight %, or from 1 weight %, to 35 weight %, based on the total solids weight of the first coating composition.

For some end use applications, it may be desirable to substantially match the refractive index of the optical substrate to which the first coating composition is applied. Such a refractive index match of the first coating layer and the optical substrate can serve to minimize or eliminate altogether "interference patterns" that can result from too great a difference between the refractive indices of the first coating composition and the substrate. Such interference patterns can be observed visually and are often referred to as "rainbow" patterns noted on the surface of the coated substrate. For example, the first coating composition may comprise a refractive index modifier in an amount sufficient for the first coating layer to match the refractive index of the optical substrate, such as from 1.50 to 1.80, for instance 1.50, 1.55, 1.60, 1.67 or 1.74. The difference between the refractive index of the substrate and the first coating layer may be up to +/−0.30, such as up to +/−0.20, such as up to +/−0.10.

In addition, the coating composition can comprise other additional materials including, but not limited to, additional resins, provided that any additional materials do not adversely affect the desired optical properties of transparency and haze. The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins that are not joined by covalent bonds and, thereby, can undergo liquid flow upon heating.

Non-limiting examples of suitable additional resins include polyurethanes other than those previously described, polyesters such as polyester polyols, polyamides, polyethers, polysiloxanes, fluoropolymers, polysulfides, polythioethers, polyureas, (meth)acrylic resins, epoxy resins, vinyl resins, and combinations thereof. The additional resins can also include non-particulate resins.

The first coating composition can also comprise one or more crosslinkers that are dispersed in the aqueous medium. As used herein, the term "crosslinker" refers to a molecule comprising two or more functional groups that are reactive with other functional groups and which is capable of linking two or more monomers or polymer molecules through chemical bonds. Non-limiting examples of crosslinkers include carbodiimides, polyols, phenolic resins, epoxy resins, beta-hydroxy (alkyl) amide resins, hydroxy (alkyl) urea resins, oxazoline, alkylated carbamate resins, (meth)acrylates, isocyanates, blocked isocyanates, polyacids, anhydrides, organometallic acid-functional materials, polyamines, polyamides, aminoplasts, aziridines, and combinations thereof.

Further, and in accordance with the present invention, the first coating composition is substantially free, essentially free, or completely free (as previously defined) of hydrazine and hydrazide functional components.

The first coating composition can also include a colorant. As used herein, "colorant" refers to any substance that imparts color and/or other opacity and/or other visual effect to the composition. The colorant can be added to the coating in any suitable form, such as discrete particles, dispersions, and/or solutions that do not impart opacity and do not adversely affect the desired transparency of the article. A single colorant or a mixture of two or more colorants can be used in the coatings of the present invention.

Example colorants include pigments (organic or inorganic), dyes, and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The pigments can also include nanodispered pigments. The terms "pigment" and "colored filler" can be used interchangeably.

Example dyes include, but are not limited to, those that are solvent and/or aqueous based such as phthalo green or blue, iron oxide, and bismuth vanadate.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of further materials that can optionally be used with the first coating composition of the present invention include plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

It is appreciated that the first coating composition can be free of any of the previously described additional materials. For example, the first coating composition can be substantially free, essentially free, or completely free of a colorant, additional resin, crosslinker, or any of the other additional materials.

As indicated, the first coating composition is applied directly over at least a portion of an optical substrate. The first coating layer can therefore act as a primer coating layer. A primer coating layer refers to an undercoating that may be deposited onto a substrate in order to prepare the surface for application of a protective or decorative coating system.

The first coating composition can be applied directly over at least a portion of the substrate by any means standard in the art, such as spraying, dipping, brushing, spin coating, curtain coating, flow coating, injection molding, casting, roll coating, spread coating, casting-coating, reverse roll-coating, transfer roll-coating, gravure roll-coating, slot-die coating, blade coating, knife coating, rod/bar coating and wire coating, inkjet printing, and combinations of any of these methods. Once applied, the first coating composition can be dehydrated or cured prior to application of additional coating layers.

The first coating layer can range from 0.1 to 10 microns, such as from 0.1 to 2 or 3 microns. The thickness of the primer can vary between any combination of the aforementioned values, inclusive of the recited values.

As used herein, "dehydration" refers to the removal of water and/or other solvents. The dehydration process can be conducted by applying heat such as at a temperature of less than 100° C., or less than 90° C., or less than 80° C. For instance, the first coating composition can be dehydrated by heating the composition at a temperature within a range of from 50° C. to 90° C., or from 60° C. to 80° C. The dehydration can also be conducted at short time periods such as, for example, within a range of from 1 minute to 60 minutes, such as from 2 minutes to 25 minutes, or from 3 minutes to 10 minutes.

The first coating composition can optionally be completely cured prior to application of additional coating layers. The term "curable," "cure," "cured," or similar terms, as used in connection with a cured or curable composition, is intended to mean that at least a portion of the polymerizable components that form the curable composition are at least partially polymerized. The curing process can be conducted by applying heat such as at a temperature of greater than 100° C., or greater than 110° C. The curing can also be conducted at time periods such as, for example, of at least 1 hour, or at least 2 hours, or at least 3 hours.

After the first coating layer is formed over the substrate, a second coating layer is formed over at least a portion of the first coating layer. The second coating layer of the present invention comprises a sol-gel. That is, at least a portion of the second coating layer is formed from a sol. As used herein, a "sol-gel" refers to a composition made as a solution (i.e., sol) and formed into a gel which then forms an open lattice structure when dried. Sol-gels are dynamic systems, wherein a solution gradually evolves into a gel-like two-phase system containing both a liquid phase and solid phase, whose morphologies range from discrete particles to continuous polymer networks within the continuous liquid phase.

The second coating layer is therefore formed from a second coating composition that comprises at least one or more components that form a sol. For example, the second coating composition comprises a sol prepared from at least an alkoxysilane, and at least one protic acid. An "alkoxysilane" refers to a silane compound with at least one alkoxy group bonded to a silicon atom. Further, the term "silane" refers to a compound derived from $SiH_4$ by substituting organic groups for at least some of the hydrogen atoms, and the term "alkoxy" refers to an —O— alkyl group.

The alkoxysilane used in the second coating composition can be represented by the general formula $R^1{}_mSi(OR^2)_{4-m}$, where each $R^1$ may be the same or different and represents an organic radical; each $R^2$ may be the same or different and represents a $C_1$ to $C_4$ alkyl group, and m is 0 to 3. $R^1$ can be, for example, a $C_1$ to $C_6$ alkyl, vinyl, methoxyethyl, phenyl, γ-glycidoxypropyl, or γ-methacryloxypropyl. $R^2$ can be methyl, ethyl, propyl or butyl. Non-limiting examples of suitable alkoxysilanes include methyl triethoxysilane, 3-glycidoxypropyl trimethoxysilane, tetramethoxysilane, tetraethoxysilane, acryloxysilane, and combinations thereof.

Further, the alkoxysilane used in the second coating composition can be dissolved in an organic solvent, such as an alcohol, and partially hydrolyzed with water. This process can be represented by the following reaction: $R^1{}_mSi(OR^2)_{4-m}+nH_2O \rightarrow R^1{}_mSi(OR^2)_{4-m-n}(OH)_n+nR^2OH$.

As indicated, the sol is also prepared with a protic acid. The protic acid is present in the second coating composition in an amount sufficient to ensure an acidic pH such that the sol present in the coating composition is hydrolyzed. Non-limiting examples of suitable protic acids can include organic acids, inorganic acids or mixtures thereof. For example, protic acids suitable for use in the present invention can include, but are not limited to, acetic acid, formic acid, glutaric acid, maleic acid, nitric acid, hydrochloric acid, phosphoric acid, hydrofluoric acid, sulfuric acid or mixtures thereof.

The sol of the second coating composition can also comprise a metal oxide compound and/or a metal alkoxide. The metal oxide and/or alkoxide can be added to the second coating composition after the alkoxysilane is partially hydrolyzed.

The metal oxide compound can comprise a metal selected from titanium, zirconium, cerium, niobium, tantalum, and/or tin. The metal oxide compound may comprise one or more different metal oxides. The metal oxides used in the second coating composition can be represented by $M_xO_y$, wherein x is 1 or 2, y is 1 to 5, and M is, for example, titanium, zirconium, cerium, niobium, tantalum, or tin.

The metal alkoxide compound can also comprise a metal selected from titanium, zirconium, cerium, niobium, tantalum, and/or tin. The metal alkoxide compound may comprise one or more different metal alkoxides. The metal alkoxides used in the second coating composition can be represented by $M(OR^3)_y$, wherein y is 1 to 5, M is any of the metals listed above, for example, titanium or zirconium, and $R^3$ represents a low molecular weight monovalent alkyl group such as methyl, ethyl, n-propyl, isopropyl, n-butyl or isobutyl. The metal alkoxide may be in dimer or higher condensed form so long as alkoxy groups remain reactive with silanol groups of a partially hydrolyzed alkoxysilane.

It is appreciated that the metal alkoxide can react with the partially hydrolyzed alkoxysilane to form a network of silicon-oxygen-metal bonds. When the metal alkoxide has completely reacted with the partially hydrolyzed alkoxysilane, additional water may be added to hydrolyze the composition, i.e., to convert remaining alkoxy groups of either the alkoxysilane or the metal alkoxide to hydroxyl groups.

The sol of the second coating composition can also comprise a polyglycidyl ether, such as a diglycidyl ether and/or a triglycidyl ether. Higher polyglycidyl ethers also can be utilized. Polyhydric alcohols that may be used to prepare the polyglycidyl ether include, for example, ethylene glycol, propylene glycol, butylene glycol, 1,6-hexylene glycol, neopentyl glycol, diethylene glycol, glycerol, trimethylol propane, resorcinol, catechol, hydroquinone, and pentaerythritol. Non-limiting examples of suitable polyglycidyl ethers include resorcinol diglycidyl ether and trimethylolpropane triglycidyl ether. Combinations of polyglycidyl ethers are also suitable.

The second coating composition can comprise water in an amount of at least 5 percent by weight, such as at least 25 percent by weight, or at least 50 percent by weight. The amount of water present in the second coating compositions can range from 5 percent to 95 percent, such as from 5 percent to 80 percent, or 5 percent to 75 percent, where percentages are based on weight.

The second coating composition also can comprise a co-solvent, such as a glycol ether or lower alcohol, in addition to water. Suitable examples of glycol ethers can include, but are not limited to, propylene glycol methyl ether, propylene glycol methyl ether acetate, dipropylene glycol monomethyl ether and/or diethylene glycol monobutyl ether. Suitable examples of lower alcohols can include, but are not limited to, ethanol, n-propanol, isopropanol, n-butanol, isobutanol, and mixtures thereof. The co-solvent can comprise a mixture of one or more glycol ethers and one or more lower alcohols. The co-solvent can be present in the second coating compositions in an amount of at least 0.5 weight percent, such as at least 2 weight percent, or at least 5 weight percent. The amount of co-solvent present in the second coating compositions can range from 0.5 percent to 90 percent, such as from 1 percent to 70 percent, or 2 percent to 60 percent, or from 5 percent to 50 percent, where percentages are based on weight.

The second coating composition can comprise at least 5 percent by weight water and at least 0.5 percent by weight co-solvent. The second coating composition can comprise 5 to 95 percent by weight water and 0.5 to 90 percent by weight co-solvent.

For some end use applications, it may be desirable to substantially match the refractive index of the optical substrate to which the second coating composition is applied. Such a refractive index match of the second coating layer and the optical substrate can serve to minimize or eliminate altogether "interference patterns" that can result from too great a difference between the refractive indices of the second coating composition and the substrate. Such interference patterns can be observed visually and are often referred to as "rainbow" patterns noted on the surface of the coated substrate. For example, the second coating composition may comprise metal oxide or other refractive index modifier in an amount sufficient for the second coating layer to match the refractive index of the optical substrate, such as from 1.50 to 1.80, for instance 1.50, 1.55, 1.60, 1.67 or 1.74. The difference between the refractive index of the substrate and the second coating layer may be up to +/−0.30, such as up to +/−0.20, such as up to +/−0.10.

Non-limiting examples of components and methods of preparing the second coating composition and second coating layer formed therefrom are also described in U.S. Pat. No. 8,084,133, such as described anywhere from column 1, line 49 to column 14, line 21, and which is incorporated by reference in its entirety.

Further, the second coating composition is also substantially free, essentially free, or completely free of hydrazine and hydrazide functional components. In addition, it is appreciated that the second coating composition is completely free of NMP.

As indicated, the second coating composition is applied directly over at least a portion of the first coating layer. The second coating composition can be applied over at least a portion of the first coating layer by any means standard in the art including, but not limited to, any of the previously described methods.

Once applied, the second coating composition is dehydrated and cured. The dehydration and curing processes can be conducted at similar temperatures and times as with the dehydration or curing of the first coating composition. It is appreciated that the second coating composition can be applied to the first coating layer after dehydration and prior to cure, or after curing the first coating composition. When the second coating composition is applied over the first coating layer after dehydration and prior to cure, the first and second coating layers can be cured together after dehydrating the second coating composition.

The coated substrate can also include additional coating layers to form the coated optical article. Non-limiting examples of additional coating layers include a separate tie layer, reflective coating layer, photochromic coating layer, dichroic coating layer, photochromic-dichroic coating layer, anti-reflective coating layer, anti-glare coating layer, linearly polarizing coating layer, circularly polarizing coating layer, elliptically polarizing coating layer, transitional coating layer, compatibilizing coating layer, functional organic coating layer, anti-soiling layer, retarder layer, or combinations thereof.

It was found that the coated optical article of the present invention provides superior adhesion to optical substrates but which does not utilize NMP or similar dangerous solvents. As such, the present invention provides a coating system for optical substrates with desirable properties and without the use of dangerous solvents.

It was also found that a first coating layer and second coating layer formed from the previously described first and second compositions that are substantially free, essentially free, or completely free of hydrazine and hydrazide functional components exhibit improved adhesion as compared to similar coatings formed with compositions that include hydrazine and/or hydrazide functional components.

The present invention is also directed to the following aspects.

A first aspect is directed to a coated optical article comprising: an optical substrate; a first coating layer applied directly over at least a portion of the optical substrate, the first coating layer formed from a first coating composition comprising an aqueous medium and keto and/or aldo functional polymeric materials dispersed in the aqueous medium; and a second coating layer applied directly over at least a portion of the first coating layer, the second coating layer comprising a sol-gel and which is formed from a second coating composition comprising a sol, wherein the first coating composition and second coating composition are each independently substantially free of hydrazine and hydrazide functional components.

A second aspect is directed to the coated optical article of the first aspect, wherein the keto and/or aldo functional polymeric materials comprise core-shell particles comprising keto and/or aldo functional groups that are dispersed in the aqueous medium, in which the core-shell particles comprise (a) a polymeric core at least partially encapsulated by (b) a polymeric shell, wherein at least a portion of the polymeric shell is covalently bonded to at least a portion of the polymeric core.

A third aspect is direct to the coated optical article of the second aspect, wherein the polymeric shell of the first coating composition comprises urethane and/or urea linkages.

A fourth aspect is directed to the coated optical article according to the second or third aspects, wherein the polymeric shell of the first coating composition comprises carboxylic acid functional groups.

A fifth aspect is directed to the coated optical article of any one of the second through fourth aspects, wherein the polymeric core comprises an addition polymer derived from ethylenically unsaturated monomers comprising a (meth) acrylate monomer, a vinyl monomer, or a combination thereof.

A sixth aspect is directed to the coated optical article of any one of the second through fifth aspects, wherein the keto and/or aldo functional groups of at least some of the core-shell particles are formed on the polymeric shell.

A seventh aspect is directed to the coated optical article of the sixth aspect, wherein the core-shell particles of at least some of the core-shell particles are formed from a mixture of reactants comprising: ethylenically unsaturated monomers; a polyurethane prepolymer comprising an isocyanate functional group and an ethylenically unsaturated group; and a Michael addition reaction product of an ethylenically unsaturated monomer comprising keto and/or aldo functional groups, and a compound comprising at least two amino groups.

An eighth aspect is directed to the coated optical article of any one of the second through seventh aspects, wherein the keto and/or aldo functional groups of at least some of the core-shell particles are formed on the polymeric core.

A ninth aspect is directed to the coated optical article of the eighth aspect, wherein the core-shell particles of at least some of the core-shell particles are formed from a mixture of reactants comprising: ethylenically unsaturated monomers, wherein at least some of the ethylenically unsaturated monomers comprise keto and/or aldo functional groups; and a polyurethane prepolymer comprising an isocyanate functional group and an ethylenically unsaturated group.

A tenth aspect is directed to the coated optical article of any one of the first through ninth aspects, wherein the first coating composition further comprises a refractive index modifier.

An eleventh aspect is directed to the coated optical article of the tenth aspect, wherein the refractive index modifier comprises a metal oxide.

A twelfth aspect is directed to the coated optical article of the tenth or eleventh aspects, wherein the refractive index modifier comprises up to 65 weight % of the first coating composition, based on the total solids weight of the first coating composition.

A thirteenth aspect is directed to the coated optical article of any one of the preceding aspects, wherein the sol of the second coating composition comprises an alkoxysilane and a protic acid.

A fourteenth aspect is directed to the coated optical article of the thirteenth aspect, wherein the alkoxysilane is partially hydrolyzed.

A fifteenth aspect is directed to the coated optical article of the thirteenth or fourteenth aspects, wherein the sol of the second coating composition further comprises a metal oxide.

A sixteenth aspect is directed to the coated optical article of any one of the thirteenth through fifteenth aspects, wherein the sol of the second coating composition further comprises a metal alkoxide.

A seventeenth aspect is directed to the coated optical article of any one of the thirteenth through sixteenth aspects, wherein the sol of the second coating composition further comprises a polyglycidyl ether.

An eighteenth aspect is directed to the coated optical article of any one of the first through seventeenth aspects, wherein the optical substrate comprises poly(meth)acrylate, TAC (triacetate cellulose), DAC (diacetate cellulose), poly-allyldiglycol carbonate (ADC), nylon, polyamide, polyurethane(urea) polymers, polyethylene terephthalate, polycarbonate, sulfur-containing polyurethane, sulfur-containing polyurethane(urea), or any combination thereof.

A nineteenth aspect is directed to the coated optical article of any one of the first through eighteenth aspects, wherein the optical article is an optical lens, an optical filter, a window, a visor, a mirror, or a display.

A twentieth aspect is directed to the coated optical article of any one of the first through eighteenth aspects, wherein the optical article is an ophthalmic lens.

A twenty first aspect is directed to the coated optical article of any one of the first through twentieth aspects, wherein the optical article has a measured haze of less than 1%.

The following examples are presented to demonstrate the general principles of the invention. The invention should not be considered as limited to the specific examples presented. All parts and percentages in the examples are by weight unless otherwise indicated.

EXAMPLES 1-4

Preparation of Primer Coating Compositions

Four primer coating composition were prepared by adding the components listed in Table 1 in the order listed, while stirring. All formulations were stirred for a minimum of 30 minutes prior to coating a substrate.

TABLE 1

| | Parts by Weight | | | |
|---|---|---|---|---|
| Component | Example 1 | Example 2 | Comparative Example 3 | Comparative Example 4 |
| Keto-functional latex[1] | 160 | 154.8 | 154.8 | 147.3 |
| Adipic acid dihydrazide | — | — | 2.01 | 4.87 |
| Deionized Water | 329.95 | 687.1 | 690.3 | 695 |
| Propylene glycol methyl ether | 507.5 | — | — | — |
| NANOBYK ®-3810[2] | — | 150.3 | 150.3 | 150.3 |
| BYK ®-306[3] | 2.51 | 2.51 | 2.51 | 2.51 |
| REFRACTIVE INDEX of cured composition[4] | 1.50 | 1.57 | 1.57 | 1.57 |

[1]A core-shell latex at 38% solids corresponding to Example 3 in WO 2017/160398A1, which is incorporated by reference herein.
[2]A 23% dispersion of cerium oxide nanoparticles in water (purchased from BYK USA, Inc.).
[3]Polyether-modified polydimethylsiloxane co-polymer at 12.5% solids in xylene and monophenyl glycol (commercially available from BYK USA, Inc.).
[4]Flakes of cured material were scratched off coated samples with a scalpel, immersed in Cargille refractive index liquids and analyzed with a polarized light microscope. Refractive index was determined by the Becke line method. The reported refractive index is nD20 (sodium D line at 20° C.) which has a standard uncertainty of ±0.002.

EXAMPLE 5

Preparation of Scratch Resistant Topcoat Composition

A second coating composition was prepared in accordance with Example 1 of U.S. Pat. No. 8,084,133 B2, which is incorporated by reference herein. As described in Example 1 of U.S. Pat. No. 8,084,133 B2, the coating composition included a sol and was prepared from components comprising γ-glycidoxypropyltrimethoxysilane, titanium n-butoxide, cerium oxide and trimethylolpropane triglycidyl ether.

EXAMPLE 6

Preparation of Coated Optical Articles

Finished 6-base plano polycarbonate and CR-39® lenses, as well as higher index substrates with refractive indices of 1.6, 1.67 and 1.74, were first soaked for five minutes in an ultrasonic bath containing a 10 weight percent sodium hydroxide solution maintained at 50° C. The lenses were then rinsed in an ultrasonic bath containing deionized water maintained at 50° C., followed by drying at ambient temperature. Each of the primer coating compositions of Examples 1 and 2, and Comparative Examples 3 and 4 were applied to the different types of substrates at ambient temperature by dip coating, using a withdrawal rate of 175 mm/min. The coated substrates were placed in an air-circulating oven for 5 minutes at 70° C. After cooling to room temperature, each of the coated lenses were then coated with the scratch-resistant topcoat of Example 5. The topcoat composition was applied by dip coating using a withdrawal rate of 100 mm/min. The topcoated lenses were placed in an air-circulating oven for 5 min at 60° C., followed by 3 hours at 120° C.

EXAMPLE 7

Evaluation of Coated Optical Articles

The coated optical articles of Example 6 were tested for coating adhesion using TEST METHOD B—CROSS-CUT TAPE TEST as described in ASTM D3359-17, using Scotch® 600 tape (3M). A "5B" corresponds to 0% coating loss. Three tape pulls were performed in the same crosscut area before rating the coating adhesion performance, which is reported in Table 2. The mode of failure was determined by a combination of xenon arc lamp and microscopic inspection.

TABLE 2

| | Adhesion Ratings per ASTM D3359-17 | | | | | |
|---|---|---|---|---|---|---|
| Primer coating | Polycarbonate | CR-39 ® RI 1.5 | RI 1.6 | RI 1.67 | RI 1.74 | Mode of Failure |
| Example 1 | 5B | 5B | | | | None |
| Example 2 | 5B | 5B | 5B | 5B | 5B | None |
| Comparative Example 3 | 4B | 4B | 4B | 4B | 4B | Adhesive failure between coating layers |
| Comparative Example 4 | 0B | 0B | | | | Adhesive failure to substrate |

As shown in Table 2, the coated optical article of the present invention (Examples 1 and 2) demonstrated superior adhesion without any adhesive failures. In contrast, Comparative Examples 3 and 4, which included hydrazide functional materials, exhibited detrimental effects on adhesion to adjacent sol-gel layers and underlying substrates.

The coated CR-39 optical articles described above were also evaluated for haze, measured at 550 nanometers by a Hunter UltraScan PRO (Hunter Associates Laboratory, Inc.) using D65 illuminant. The results are shown in Table 3, and demonstrate acceptable haze values.

TABLE 3

| Primer coating | Haze (on CR-39 ®) |
|---|---|
| Example 1 | 0.46% |
| Example 2 | 0.25% |
| Comparative Example 3 | 0.11% |
| Comparative Example 4 | not measured |

Whereas particular embodiments of this invention have been described above for purposes of illustration, it will be evident to those skilled in the art that numerous variations of the details of the present invention may be made without departing from the invention as defined in the appended claims.

The invention claimed is:

1. A coated optical article comprising:
an optical substrate;
a first coating layer applied directly over at least a portion of the optical substrate, the first coating layer formed from a first coating composition comprising an aqueous medium and keto and/or aldo functional polymeric materials dispersed in the aqueous medium; and
a second coating layer applied directly over at least a portion of the first coating layer, the second coating layer comprising a sol-gel and which is formed from a second coating composition comprising a sol,
wherein the first coating composition and second coating composition are each independently substantially free of hydrazine and hydrazide functional components; and wherein the keto and/or aldo functional polymeric materials are present in the first coating composition in an amount of at least 50 weight %, based on the total solids weight of the first coating composition.

2. The coated optical article of claim 1, wherein the keto and/or aldo functional polymeric materials comprise core-shell particles comprising keto and/or aldo functional groups that are dispersed in the aqueous medium, in which the core-shell particles comprise (a) a polymeric core at least partially encapsulated by (b) a polymeric shell, wherein at least a portion of the polymeric shell is covalently bonded to at least a portion of the polymeric core.

3. The coated optical article of claim 2, wherein the polymeric shell of the first coating composition comprises urethane and/or urea linkages.

4. The coated optical article of claim 2, wherein the polymeric shell of the first coating composition comprises carboxylic acid functional groups.

5. The coated optical article of claim 2, wherein the polymeric core comprises an addition polymer derived from ethylenically unsaturated monomers comprising a (meth) acrylate monomer, a vinyl monomer, or a combination thereof.

6. The coated optical article of claim 2, wherein the keto and/or aldo functional groups of at least some of the core-shell particles are formed on the polymeric shell.

7. The coated optical article of claim 6, wherein the core-shell particles of at least some of the core-shell particles are formed from a mixture of reactants comprising:
ethylenically unsaturated monomers;
a polyurethane prepolymer comprising an isocyanate functional group and an ethylenically unsaturated group; and
a Michael addition reaction product of an ethylenically unsaturated monomer comprising keto and/or aldo functional groups, and a compound comprising at least two amino groups.

8. The coated optical article of claim 2, wherein the keto and/or aldo functional groups of at least some of the core-shell particles are formed on the polymeric core.

9. The coated optical article of claim 8, wherein the core-shell particles of at least some of the core-shell particles are formed from a mixture of reactants comprising:
ethylenically unsaturated monomers, wherein at least some of the ethylenically unsaturated monomers comprise keto and/or aldo functional groups; and
a polyurethane prepolymer comprising an isocyanate functional group and an ethylenically unsaturated group.

10. The coated optical article of claim 1, wherein the first coating composition further comprises a refractive index modifier.

11. The coated optical article of claim 10, wherein the refractive index modifier comprises a metal oxide.

12. The coated optical article of claim 10, wherein the refractive index modifier comprises up to 65 weight % of the first coating composition, based on the total solids weight of the first coating composition.

13. The coated optical article of claim 1, wherein the sol of the second coating composition comprises an alkoxysilane and a protic acid.

14. The coated optical article of claim 13, wherein the alkoxysilane is partially hydrolyzed.

15. The coated optical article of claim 13, wherein the sol of the second coating composition further comprises a metal oxide.

16. The coated optical article of claim 13, wherein the sol of the second coating composition further comprises a metal alkoxide.

17. The coated optical article of claim 13, wherein the sol of the second coating composition further comprises a polyglycidyl ether.

18. The coated optical article of claim 1, wherein the optical substrate comprises poly(meth)acrylate, TAC (triacetate cellulose), DAC (diacetate cellulose), poly-allyldiglycol carbonate (ADC), nylon, polyamide, polyurethane (urea) polymers, polyethylene terephthalate, polycarbonate, sulfur-containing polyurethane, sulfur-containing polyurethane (urea), or any combination thereof.

19. The coated optical article of claim 1, wherein the optical article is an optical lens, an optical filter, a window, a visor, a mirror, or a display.

20. The coated optical article of claim 1, wherein the optical article is an ophthalmic lens.

* * * * *